United States Patent
Saxe et al.

(10) Patent No.: US 8,516,503 B2
(45) Date of Patent: Aug. 20, 2013

(54) METHOD AND SYSTEM FOR SELF-TUNING OF HARDWARE RESOURCES

(75) Inventors: Eric C. Saxe, Livermore, CA (US); Darrin P. Johnson, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 458 days.

(21) Appl. No.: 12/688,803

(22) Filed: Jan. 15, 2010

(65) Prior Publication Data

US 2011/0179424 A1    Jul. 21, 2011

(51) Int. Cl.
*G06F 3/00*     (2006.01)
*G06F 9/44*     (2006.01)
*G06F 9/46*     (2006.01)
*G06F 13/00*    (2006.01)
*G06F 9/00*     (2006.01)
*G06F 1/24*     (2006.01)

(52) U.S. Cl.
USPC ............. 719/321; 719/320; 713/1; 713/100

(58) Field of Classification Search
None
See application file for complete search history.

(56) References Cited

U.S. PATENT DOCUMENTS

| | | | |
|---|---|---|---|
| 7,873,877 B2 * | 1/2011 | Rowles et al. | 714/47.1 |
| 2003/0033410 A1 * | 2/2003 | Kobayashi | 709/225 |
| 2005/0138438 A1 * | 6/2005 | Bodas | 713/300 |
| 2007/0028298 A1 * | 2/2007 | Snyder et al. | 726/3 |

* cited by examiner

*Primary Examiner* — H S Sough
*Assistant Examiner* — Craig Dorais
(74) *Attorney, Agent, or Firm* — Osha Liang LLP

(57) ABSTRACT

A system for self-tuning hardware resources includes a processor, a hardware resource, an operating system (OS), a metric monitoring unit (MMU), and a configuration engine (CE). The OS determines: the hardware resource; a metric for monitoring the hardware resource; a hardware resource management policy for the hardware resource; and a primary and secondary sub-ranges for the metric. The OS sends a hardware resource management policy directive to the CE. The MMU monitors the hardware resource to obtain data for the metric. The CE receives the hardware resource management policy directive, determines the primary and secondary sub-ranges from the hardware resource management policy directive, obtains data for the metric from the MMU. When data is outside the primary sub-range and inside the secondary sub-range, the CE determines and executes a hardware resource optimization routine to bring hardware resource utilization into compliance with the primary sub-range.

6 Claims, 6 Drawing Sheets

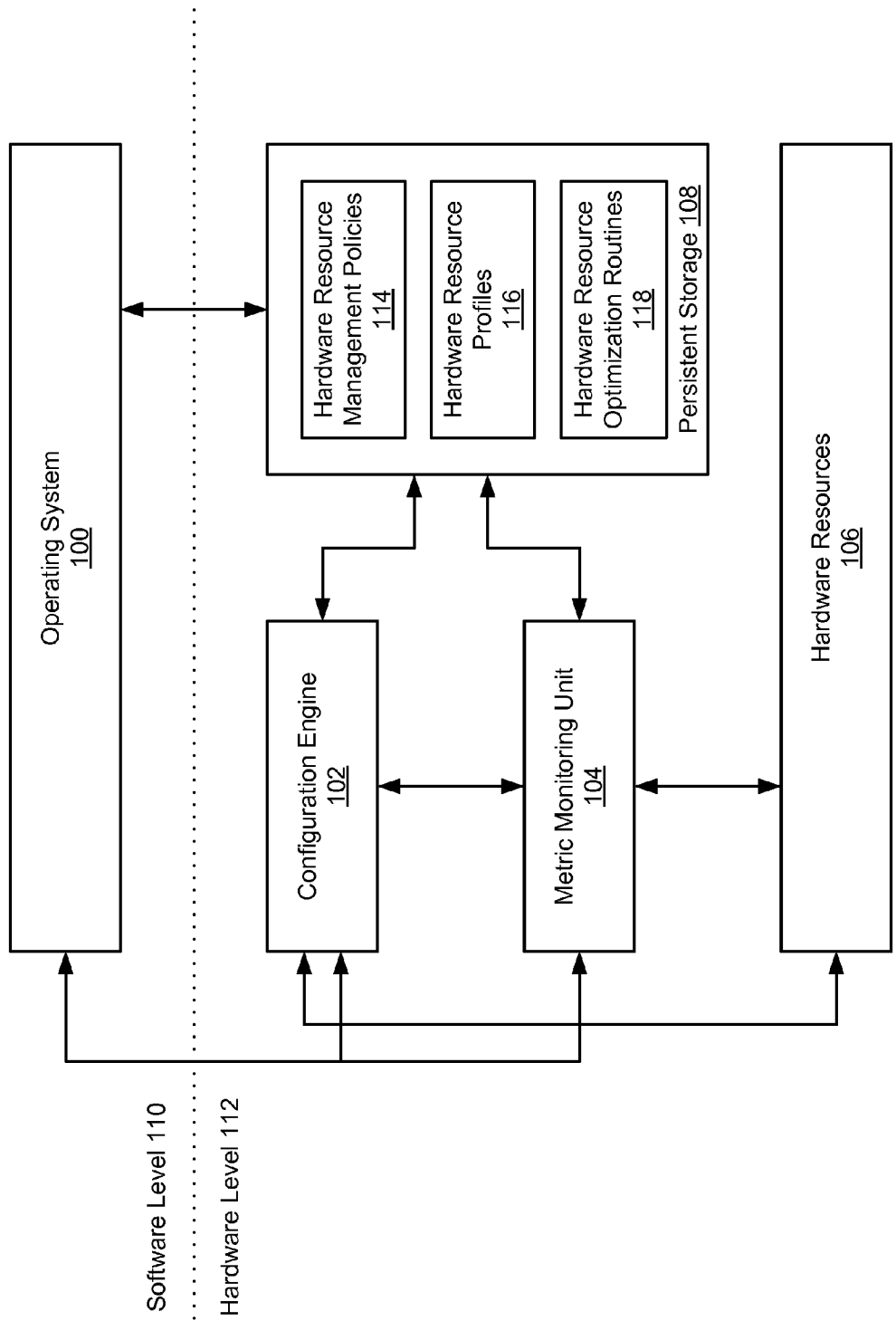

METHOD AND SYSTEM FOR SELF-TUNING OF HARDWARE RESOURCES

BACKGROUND

A modern computer system may be conceptually divided into hardware, operating system, and application programs. The hardware (i.e., central processing unit (CPU), memory, persistent storage devices, and input/output (I/O) devices) provides the basic computing resources. An operating system is a program that functions as an intermediary between the application program layer and the computer hardware. Application programs (i.e., compilers, database systems, software, and business programs) define the ways in which these hardware resources are used to solve the computing problems of the users. Users may include people, machines, and other computers that use the application programs, which in turn employ hardware resources to solve numerous types of problems. To this end, the operating system is involved in coordinating the use of the hardware resource base to enable a broad range of computative tasks (i.e., memory management, hardware resource management, maintaining a file system, processing user-level requests, administrative tasks, networking tasks, etc.).

SUMMARY

In general, in one aspect, the invention relates to a system for self-tuning of hardware resources. The system includes a processor, a hardware resource, an operating system, a metric monitoring unit, and a configuration engine. The operating system is configured to determine the hardware resource. The operating system is further configured to determine a metric used for monitoring the hardware resource. The operating system is further configured to determine a hardware resource management policy for governing utilization of the hardware resource. The operating system is further configured to determine a primary sub-range and a secondary sub-range for the metric based on the hardware resource management policy. The operating system is further configured to send a hardware resource management policy directive to a configuration engine, where the hardware resource management policy directive specifies the primary sub-range and the secondary sub-range for the metric. The metric monitoring unit is configured to monitor the hardware resource to obtain a hardware resource data value for the metric. The configuration engine is configured to receive the hardware resource management policy directive from the operating system. The configuration engine is further configured to determine the primary sub-range and the secondary sub-range for the metric from the hardware resource management policy directive. The configuration is further configured to obtain the hardware resource data value for the metric from the metric monitoring unit. The configuration engine is further configured to, when the hardware resource data value for the metric is outside the primary sub-range and inside the secondary sub-range, (i) determine a hardware resource optimization routine to bring utilization of the hardware resource into compliance with the primary sub-range and (ii) execute the hardware resource optimization routine.

In general, in one aspect, the invention relates to a computer readable medium including executable instructions for self-tuning of hardware resources. Executable instructions include instructions to: (i) receive, by a configuration engine, a hardware resource management policy directive from an operating system, where the hardware resource management policy directive specifies a primary sub-range and a secondary sub-range for a metric based on a hardware resource management policy determined by the operating system; (ii) determine, by the configuration engine, the primary sub-range and the secondary sub-range for the metric from the hardware resource management policy directive; (iii) obtain, by the configuration engine, a hardware resource data value for the metric from a metric monitoring unit; (iv) when the hardware resource data value for the metric is outside the primary sub-range and inside the secondary sub-range: (a) determine, by the configuration engine, a hardware resource optimization routine to bring utilization of the hardware resource into compliance with the primary sub-range and (b) execute, by the configuration engine, the hardware resource optimization routine.

Other aspects of the invention will be apparent from the following description and the appended claims.

BRIEF DESCRIPTION OF DRAWINGS

FIG. 1 shows a system in accordance with one or more embodiments of the invention.

DETAILED DESCRIPTION

Figure 2A:
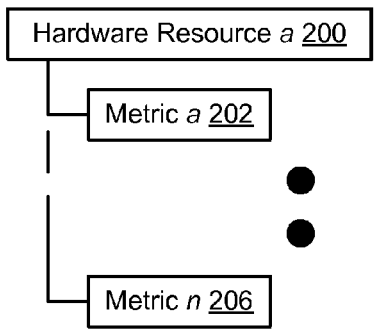
FIGS. 2a and 2b show data structures maintained in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for self-tuning of hardware resources. A hardware resource may be, for example, a memory device (e.g., non-volatile memory, volatile memory, etc.), a processor (e.g., single core, multi-core), an I/O device (e.g., a network interface card), a cooling device (e.g., a cooling fan, etc.) or any other hardware device capable of receiving a request from the operating system. Embodiments of the invention are directed to self-tuning of hardware resources that have been discovered by an operating system and monitored for performance.

In one or more embodiments of the invention, discovery of hardware resources allows software, hardware, and firmware components to enumerate the various hardware resources operative in a given system. Further, each discoverable hardware resource is associated with a profile for the hardware resource. In one or more embodiments of the invention, a profile for a hardware resource specifies one or more metrics. A metric is a quantifiable characteristic that describes the operative state for a hardware resource. Examples of metrics may relate to, but are not limited to, bandwidth utilization, cache utilization, power consumption readings (e.g., voltages, current, power), and thermal readings.

In one or more embodiments of the invention, the one or metrics defined for a hardware resource are the metrics that most pertain to or are relevant in characterizing the performance of the hardware resource. For example, a metric for cache misses may be significantly more critical to the performance of a hardware resource than, for example, bus utilization. Alternatively, for a different hardware resource, the opposite may be true (i.e., bus utilization is a more critical indicator of performance than cache misses). Accordingly, in one or more embodiments of the invention, the metrics defined for a hardware resource by a profile for the hardware resource are metrics that are considered stronger indicators of the performance of the hardware resource. FIG. 2a provides an example of a data structure which may be used to define a profile for a hardware resource in terms of the one or more metrics relevant to the operation of the hardware resource In one or more embodiments of the invention, metrics defined by a profile for a hardware resource are used as a basis for monitoring the hardware resource. As such, hardware resource data obtained from a metric monitoring unit corresponds with the one or more metrics defined by the profile for the hardware resource. For example, assume that a profile for a hypothetical hardware resource specifies a bandwidth utilization metric and a cache utilization metric. Accordingly, monitoring the hypothetical hardware resource provides quantitative measurements for the bandwidth utilization and cache utilization for the hardware resource.

Further, in one or more embodiments of the invention, hardware resource data gathered as a result of monitoring a hardware resource may be used to determine whether the hardware resource is performing at a preferable level as specified in a hardware resource management policy. In one or more embodiments of the invention, a hardware resource management policy is directed to achieve a system-level performance objective. Examples of system-level performance objectives may include, but are not limited to, maximizing transactions or operations per second, maximizing megabytes per second, maximizing megabits per second, maximizing transaction latency, minimizing I/O operations per second, maximizing or ensuring adequate bandwidth (e.g., memory, I/O, etc.), minimizing or bounding latency (e.g., memory, I/O, etc.), analysis of variance (e.g., in relation to any of the above and/or other system-level performance objectives), and statistical process control (e.g., in relation to any of the above and/or other system-level performance objectives). As such, in one or more embodiments of the invention, a hardware resource management policy specifies performance objectives which must be met on a per-hardware resource basis so the system-level performance objective may be met. Specifically, a hardware resource management policy may specify primary and secondary sub-ranges for each metric defined for each hardware resource. In one or more embodiments of the invention, a primary sub-range for a metric may represent the quantitative range in which it is preferable (i.e., optimal) for a resource to perform pursuant to a system achieving a system-level performance objective. In one or more embodiments of the invention, a secondary sub-range for a metric may represent the quantitative range in which a resource must perform for a system to achieve a system-level performance objective, As such, a secondary sub-range is broader and inclusive of a primary sub-range for the same metric under a hardware resource management policy. A more detailed discussion of hardware resource management policies is provided in relation to FIG. 2b.

In one or more embodiments of the invention, self-tuning of a hardware resource may be performed in response to hardware resource data obtained through monitoring the hardware resource. Specifically, embodiments of the invention allow for execution of self-tuning (i.e., corrective) measures when the quantitative hardware resource data for a hardware resource is determined to fall outside at a specified performance level. Self-tuning measures may be characterized as low-level or high-level. An example of a low-level self-tuning measure may involve the execution of a resource optimization routine to reconfigure a sub-optimal hardware resource (e.g., adjustment of an operating parameter for the hardware resource). An example of a high-level self-tuning measure may involve the selection of a different hardware resource management policy by an operating system. A more detailed discussion of self-tuning is provided in relation to the FIGS. 3b and 3c.

FIG. 1 shows a system in accordance with one or more embodiments of the invention. Specifically, FIG. 1 shows system components operating on both a software-level (110) and a hardware-level (112). The depicted software-level component is namely an operating system (100). The depicted hardware-level components include hardware resources (106), a metric monitoring unit (104), a configuration engine (102), and a persistent storage device (108).

In one or more embodiments of the invention, a hardware resource (106) may be utilized in accordance with a request issued by an operating system (100). A hardware resource (106) may be, for example, a memory device (e.g., non-volatile memory, volatile memory, etc.), a processor (e.g., single core, multi-core), an I/O device (e.g., a network interface card), a cooling device (e.g., a cooling fan, etc.) or any other hardware device capable of receiving a request from the operating system (100).

In one or more embodiments of the invention, a persistent storage device (108) may store data maintained in accordance with embodiments of the invention. Examples of stored data may include but are not limited to hardware resource management policies (114), hardware resource profiles (116), and hardware resource optimization routines (118). A more detailed discussion of data maintained in accordance with embodiments of the invention is provided in relation to FIGS. 2a and 2b.

In one or more embodiments of the invention, an operating system (100) is configured to send requests and receive responses. For example, the operating system (100) may issue a request to and receive a response from the persistent storage device (108) for purposes of obtaining data maintained in accordance with one or more embodiments of the invention. For example, the operating system (100) may request a hardware resource management policy (114) or a profile for a hardware resource (116). The operating system (100) may issue a request to and receive a response from the metric monitoring unit (104) for purposes of obtaining hardware resource data obtained from one or more hardware resources (106). The operating system (100) may also issue a request to the configuration engine (102) in the form of a hardware resource management policy directive for purposes of specifying a new hardware resource management policy.

In one or more embodiments of the invention, the operating system (100) is configured to receive interrupts and/or other types of system notifications. For example, the operating system (100) may receive an interrupt from the configuration engine (102) when the hardware resource data measured for a monitored hardware resource (106) is outside a preferable performance range.

In one or more embodiments of the invention, a metric monitoring unit (104) is configured to monitor a hardware resource (106) for purposes of obtaining a hardware resource data value related to the performance (e.g., bandwidth utilization, cache utilization, power consumption readings, thermal readings, etc.) of the hardware resource (106). In one or more embodiments of the invention, the metric monitoring unit (104) may be implemented in firmware or software and configured to communicate with one or more hardware-level sensors (not shown) for purposes of obtaining hardware resource data pertaining to the performance of a hardware resource (106). For example, the metric monitoring unit (104) may interface with a hardware-level thermal sensor to obtain hardware resource data pertaining to a temperature level for a particular hardware resource (106). In one or more other embodiments of the invention, the metric monitoring unit (104) may be implemented in hardware as a designated hardware component. In such embodiments, the metric monitoring unit (104) may periodically obtain (i.e., poll) hardware-level sensors (not shown) for purposes of obtaining hardware resource data pertaining to the performance of a hardware resource (106) and subsequently provide the most recently-obtained hardware resource data when necessary. In one or more embodiments of the invention, the metric monitoring unit (104) may provide hardware resource data for a monitored hardware resource (106) in response to a request from an operating system (100) and/or a configuration engine (102). In one or more embodiments of the invention, the metric monitoring unit (104) is configured to send a request to and receive a response from a persistent storage device (108) for purposes of obtaining one or more hardware resource profiles (116).

In one or more embodiments of the invention, a configuration engine (102) is configured to obtain hardware resource data for a hardware resource (106) from a metric monitoring unit (104). For example, in one or more embodiments of the invention, the configuration engine (102) may send a request for obtaining hardware resource data from the metric monitoring unit (104). Accordingly, the configuration engine (102) may receive a response providing the requested hardware resource data from the metric monitoring unit (104). In one or more embodiments of the invention, the configuration engine (102) may receive a hardware resource management policy directive from an operating system (100) specifying a new hardware resource management policy. Accordingly, in receiving a hardware resource management policy directive, the configuration engine (102) may: (i) determine one or more new metrics in addition to primary and secondary sub-ranges associated with the new metrics; and/or (ii) determine new primary and secondary sub-ranges associated with metrics specified under the previous hardware resource management policy. In one or more embodiments of the invention, the configuration engine (102) may send a request to and receive a response from a persistent storage device (108) for purposes of obtaining a hardware resource optimization routine (116). In one or more embodiments of the invention, the configuration engine (102) may execute the hardware resource optimization routine (116). For example, the configuration engine (102) may send a reconfiguration request to a hardware resource (106) pursuant to the hardware resource optimization routine (116). In one or more embodiments of the invention, the configuration engine (102) may send an interrupt request to the operating system (100) when a hardware resource (106) is performing sub-optimally. In one or more embodiments of the invention, the configuration engine (102) may send a request to and receive a response from a persistent storage device (108) for purposes of obtaining a profile (116) for a hardware resource.

One or more embodiments of the invention may be implemented using a hypervisor (not shown) and a guest operating system (not shown). Specifically, in such embodiments, the hypervisor may perform the functions described above in relation to the operating system (100). In addition, the guest operating system may perform the functions described above in relation to the configuration engine (102).

Figure 2B:
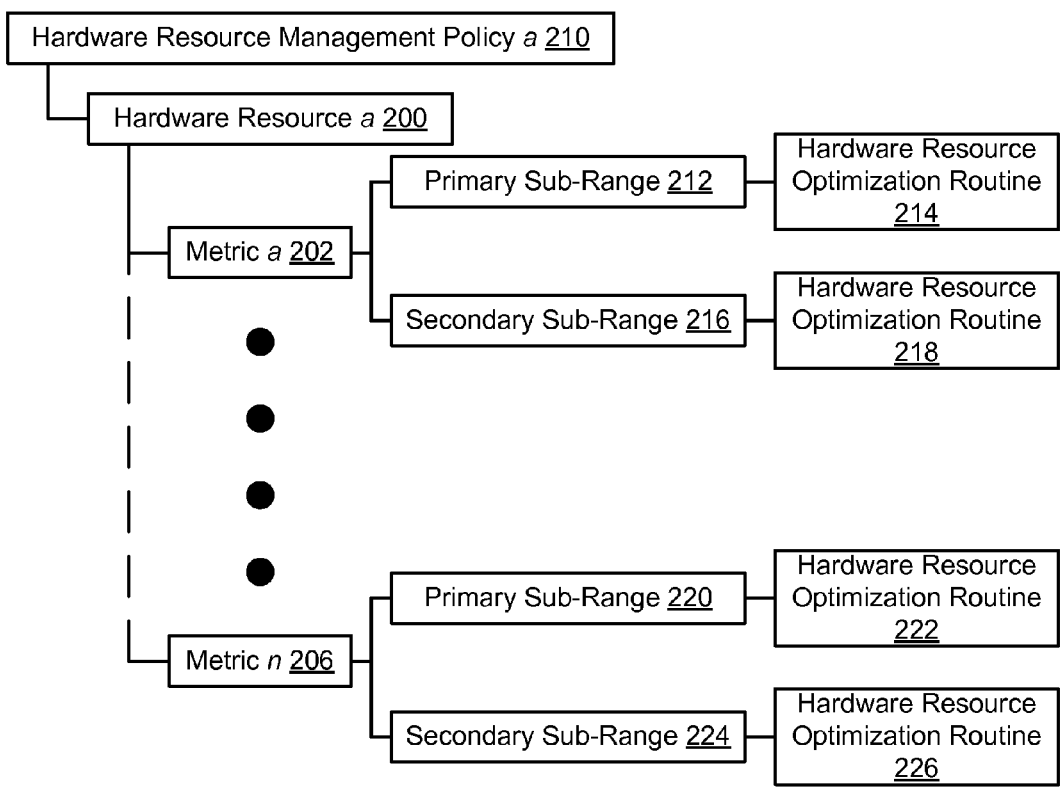

FIGS. 2a and 2b show data structures maintained in accordance with one or more embodiments of the invention. The data structure shown in FIG. 2a may be used, for example, to define a profile for a hardware resource (200). Specifically, FIG. 2a shows that a particular hardware resource (200) is associated with a number of metrics (202, 206). For example, the profile for a storage device may characterize the performance of the storage device in terms of throughput and latency.

The data structure shown in FIG. 2b may be used, for example, to define a hardware resource management policy (210). Specifically, FIG. 2b shows that a particular hardware resource management policy (210) may be associated with at least one hardware resource (200). Further, the hardware resource management policy (210) specifies a number of metrics (202, 206) associated with the hardware resource (200).

FIG. 2b further shows that the policy (210) may also define a primary sub-range (212, 220) and a secondary sub-range (216, 224) for each metric (202, 206). In one or more embodiments of the invention, the secondary sub-range (216, 224) defined for a metric (202, 206) represents the quantifiable range of the metric under which the hardware resource (200) is required to operate pursuant to a selected hardware resource management policy (210). In one or more embodiments of the invention, the primary sub-range (212, 220) defined for a metric (202, 206) represents the quantifiable range of the metric under which it is preferable (i.e., ideal or optimal) for the hardware resource (200) to operate pursuant to the selected hardware resource management policy (210). For example, a hardware resource management policy may specify primary and secondary sub-ranges for latency and throughput metrics for a hardware resource that is a type of storage device.

In addition, FIG. 2b shows that for each primary and secondary sub-range (212, 216, 220, 224) the policy (210) may also specify a hardware resource optimization routine (214, 218, 222, 226). In one or more embodiments of the invention, a hardware resource optimization routine (214, 218, 222, 226) is a set of instructions or tasks which may be executed to perform low-level self-tuning to bring or maintain a metric within the intended metric sub-range. In one or more embodiments of the invention, a hardware resource optimization routine (214, 218, 222, 226) when executed may reconfigure a hardware resource. For example, execution of a hardware resource optimization routine (214, 218, 222, 226) may result in the adjustment of an operating parameter for a hardware resource (200).

Figure 3A:
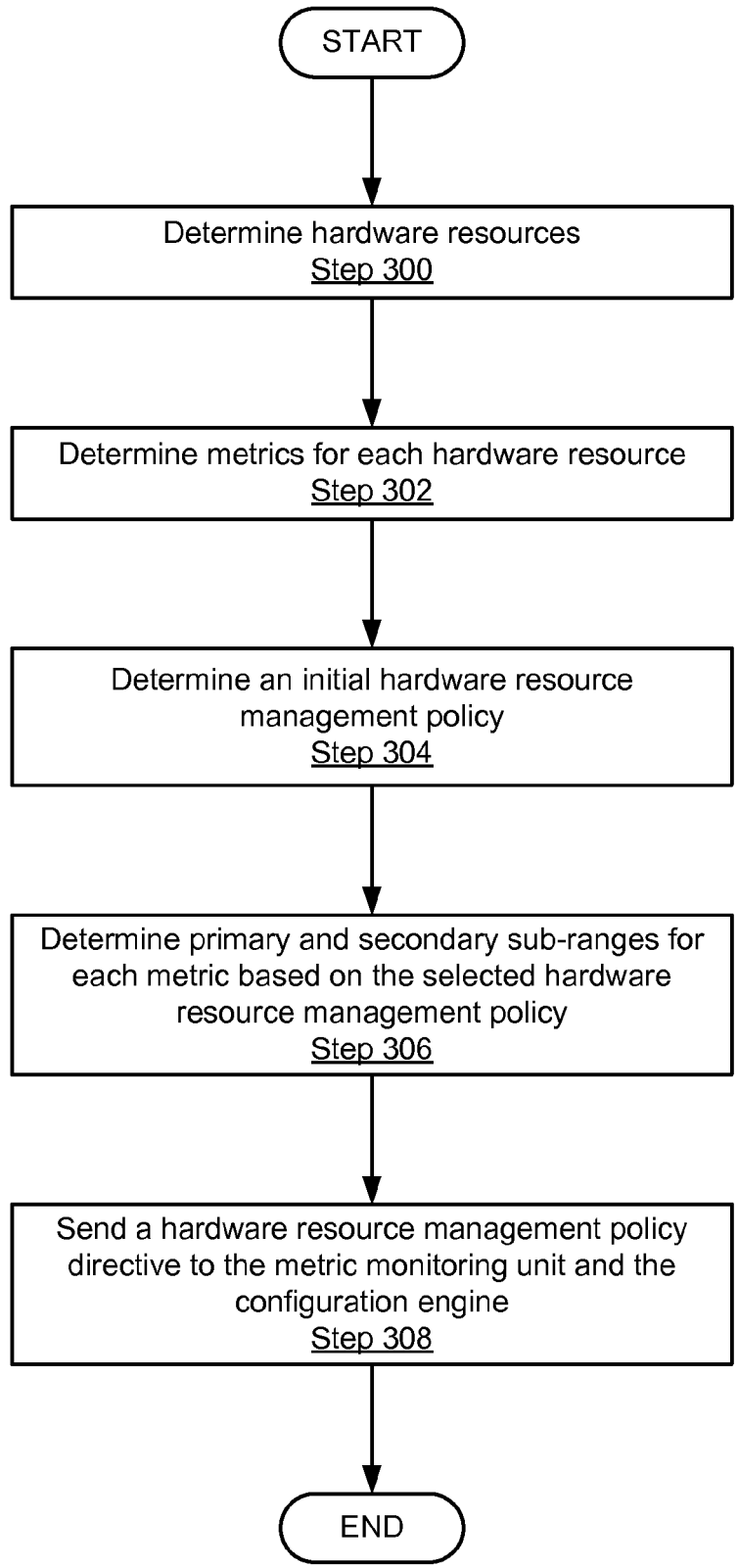
FIGS. 3a, 3b, and 3c show flowcharts in accordance with one or more embodiments of the invention.
Figure 3B:
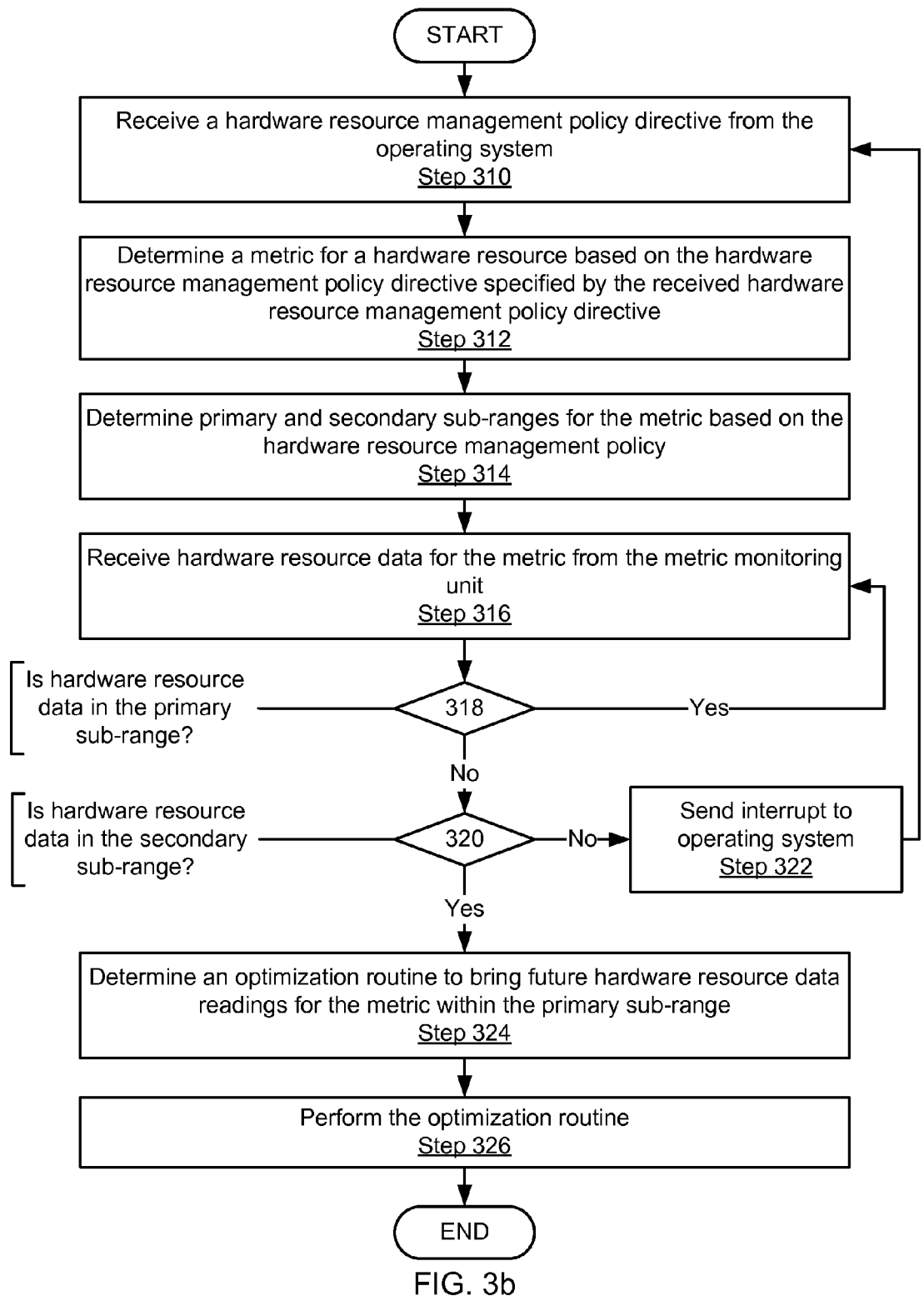
Figure 3C:
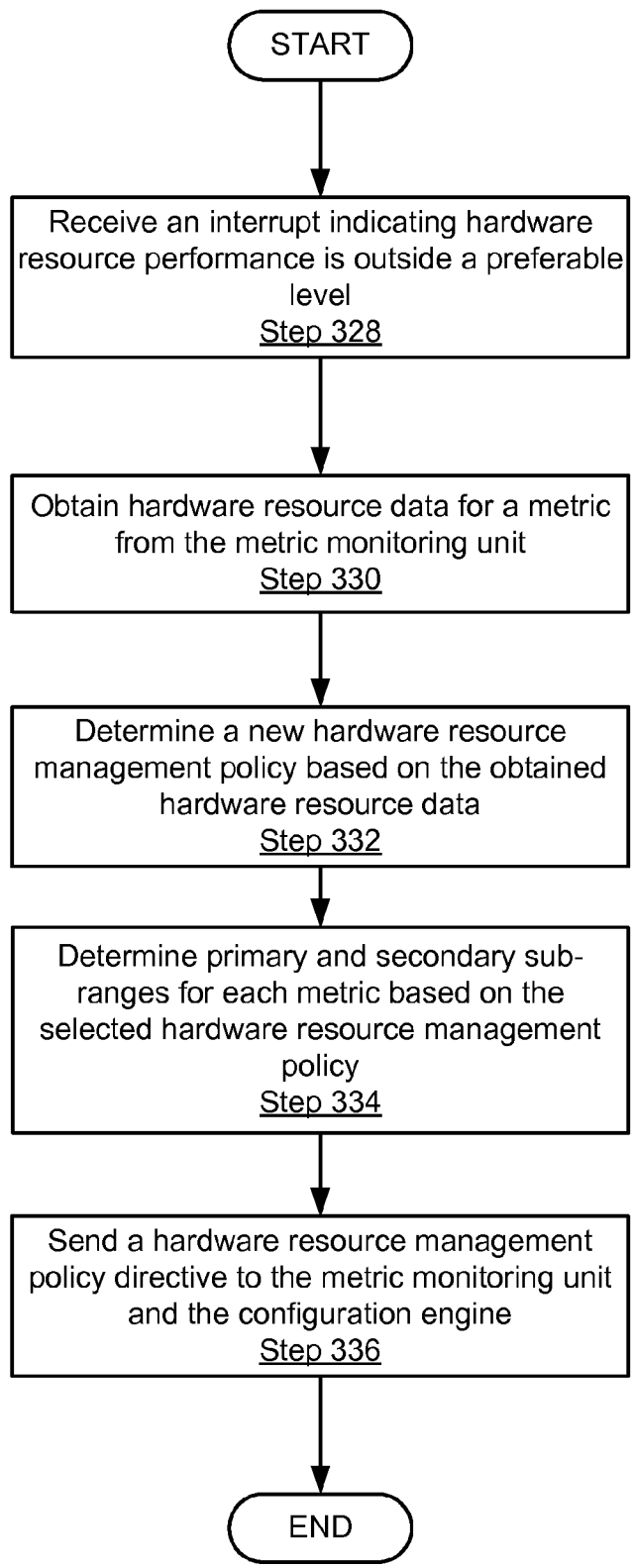

FIGS. 3a, 3b, and 3c show flowcharts in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation.

The flowchart of FIG. 3a shows steps taken by an operating system in accordance with one or more embodiments of the invention. Specifically, the process shown in FIG. 3a may be used, for example, when the operating system is loading for purposes of discovering hardware resources and selecting an initial hardware resource management policy.

In Step 300, hardware resources are determined. In one or more embodiments of the invention, the operating system may obtain one or more profiles for hardware resources operating in the computer system from a persistent storage device used to maintain data used in accordance with embodiments of the invention. An example of a data structure that may be used to maintain a profile for a hardware resource is provided and discussed in relation to FIG. 2a.

In Step 302, one or more metrics are determined for each hardware resource determined in Step 301. In one or more embodiments of the invention, the relevant metrics for a particular hardware resource are obtained from a profile for a hardware resource.

In Step 304, an initial hardware resource management policy is determined. As previously mentioned, hardware resource management policies may be stored in a persistent storage device in accordance with one or more embodiments of the invention. An example of a data structure that may be used to specify a hardware resource management policy is provided and discussed in relation to FIG. 2b. In one or more embodiments of the invention, a particular hardware resource management policy is pre-defined for system startup purposes.

In Step 306, the primary and secondary sub-ranges are determined for each of the metrics determined in Step 302. In one or more embodiments of the invention, the primary and secondary metric sub-ranges are obtained from the hardware resource management policy determined in Step 306.

In Step 380, a hardware resource management policy directive message, specifying the particular hardware resource management policy determined in Step 304, is issued to the configuration engine and optionally to the metric monitoring unit by the operating system.

The process shown in FIG. 3b may be used, for example, by a configuration engine in response to metric data values obtained by the metric monitoring unit. In Step 310, a hardware resource management policy directive is received from an operating system. In one or more embodiments of the invention, the hardware resource management policy directive specifies a particular hardware resource management policy determined by the operating system.

In Step 312, a metric for a hardware resource is determined based on the hardware resource management policy specified by the hardware resource management policy directive. In one or more embodiments of the invention, the relevant metrics for a particular hardware resource are obtained from a profile for a hardware resource.

In Step 314, primary and secondary metric sub-ranges are obtained for a metric determined in Step 312. Specifically, in one or more embodiments of the invention, the primary and secondary metric sub-ranges are obtained from the definition for the hardware resource management policy specified by the hardware resource management policy directive received in Step 310.

In Step 316, hardware resource data is obtained for the metric from the metric monitoring unit. In one or more embodiments of the invention, the hardware resource data is obtained when (i) the configuration engine sends a request for hardware resource data for a metric and (ii) the metric monitoring unit provides a response including the requested-for hardware resource data.

In Step 318, a determination is made as to whether the obtained hardware resource data is within the primary sub-range for a metric. If the obtained hardware resource data is within the primary sub-range for the metric, the method proceeds to Step 316. Said another way, performing Step 316 allows embodiments of the invention to continue to monitor the hardware resource rather than perform a self-tuning measure. If the obtained metric data value is not within the primary sub-range for the metric, the method proceeds to Step 320.

In Step 320, a determination is made as to whether the obtained hardware resource data is within the secondary sub-range for the metric. If the obtained hardware resource data is not within the secondary sub-range for the metric, the method proceeds to Step 322. In Step 322, an interrupt message is sent from the configuration engine to the operating system. For the operating system, the effect of receiving an interrupt message from the configuration engine is shown and discussed in relation to FIG. 3c. As FIG. 3c shows, the operating system issues a different hardware resource management policy in response to receiving an interrupt message. Accordingly, a new hardware resource management policy directive is received by the configuration engine as shown in Step 310 following Step 322.

Returning to Step 320, if a determination is made that the obtained hardware resource data is within the secondary sub-range for the metric, the method proceeds to Step 324. In Step 324, a hardware resource optimization routine is determined for purposes of bringing subsequent hardware resource data measurements within the primary sub-range for the metric. In one or more embodiments of the invention, the hardware resource optimization routine is determined using the association between the primary metric sub-range and a corresponding hardware optimization routine as defined in a hardware resource management policy (e.g., shown and discussed in relation to FIG. 2b). In Step 326, the determined hardware optimization routine is performed.

In one or more embodiments of the invention (not shown in FIG. 3b), Step 322 may perform a self-tuning measure for purposes of bringing subsequent hardware resource data measurements within the secondary sub-range for the metric. Specifically, in such embodiments of the invention, a hardware resource optimization routine may be determined using the association between the secondary sub-range for the metric and a corresponding hardware optimization routine as defined in a hardware resource management policy (e.g., shown and discussed in relation to FIG. 2b). Accordingly, embodiments of the invention may perform the hardware optimization routine associated with the secondary sub-range for the metric. If hardware resource data for the metric obtained subsequent to the performance of the aforementioned hardware optimization routine does not fall within the secondary sub-range for the metric, then the configuration engine may send an interrupt message to the operating system.

The flowchart of FIG. 3c shows steps taken by an operating system in accordance with one or more embodiments of the invention. In particular, the process shown in FIG. 3c may be used, for example, when the operating system has received an interrupt message indicating sub-optimal performance of a hardware resource.

In Step 328, an interrupt is received indicating that performance for a hardware resource has fallen outside of a preferable level. In Step 330, hardware resource data for a metric is obtained from the metric monitoring unit. In one or more embodiments of the invention, the operating system makes a request to and receives a response from the metric monitoring unit to obtain current hardware resource data for the hardware resource. In Step 332, a new hardware resource management policy is selected. In one or more embodiments of the invention, the new hardware resource management policy is selected based on the hardware resource data obtained in Step 330.

In Step 334, a new set of primary and secondary sub-ranges are obtained for each metric specified for the hardware resource by the newly-selected hardware resource management policy.

In Step 336, a hardware resource management policy directive message is sent to the metric monitoring unit and the configuration engine. In one or more embodiments of the invention, the hardware resource management policy directive specifies the new hardware resource management policy selected in Step 332.

In one or more embodiments of the invention, the operating system may modify the way in which the operating system provisions hardware resources to applications as an alternative (not shown in FIG. 3) to performing Steps 332-336. For example, upon receiving an interrupt message indicating that hardware resource performance is suffering as a result of poor cache utilization, the operating system may adjust the way in which threads are scheduled to hardware resources. Accordingly, threads may be scheduled as either compute-bound (i.e., CPU-bound) or memory-bound. Alternatively, the operating system may also reduce utilization of the hardware resource to reduce contention or thrashing issues.

Embodiments of the invention embodiments of the invention allow for self-tuning (i.e., corrective) measures to be taken when a hardware resource is determined to be performing at a sub-optimal level. For example, as shown in FIG. 3b, if a metric data value for a hardware resource is outside of the primary sub-range for a metric but still within the secondary sub-range for the metric, embodiments of the invention may determine and perform the hardware optimization routine. Because a hardware optimization routine involves adjustment of operating parameters for a hardware resource, any modification is contained within the hardware layer. Said another way, it does not require coordination with the operating system and, as such, can be described as a low-level self-tuning measure.

In contrast, when the hardware resource data is outside of both the primary and secondary sub-ranges for a metric, embodiments of the invention may perform a high-level self-tuning measure. Specifically, as shown in FIGS. 3b and 3c, embodiments of the invention may send an interrupt from the hardware (e.g., configuration engine) level to the software level (i.e., operating system). The result of the interrupt, as shown in FIG. 3c, is the selection of a new hardware resource management policy which in turn necessitates a new set of metric sub-ranges for monitoring purposes. Accordingly, this requires coordination between the operating system and the components residing at the hardware level.

By allowing for the specification of primary and secondary sub-ranges for a metric of a corresponding hardware resource, system designers are given the flexibility to test and define optimal operating parameters for the specific hardware resource context of a particular system. Accordingly, the ability to uniquely tailor optimization mechanisms allows system designers to account for variances introduced by way of a multitude of available hardware architectures.

Figure 4:
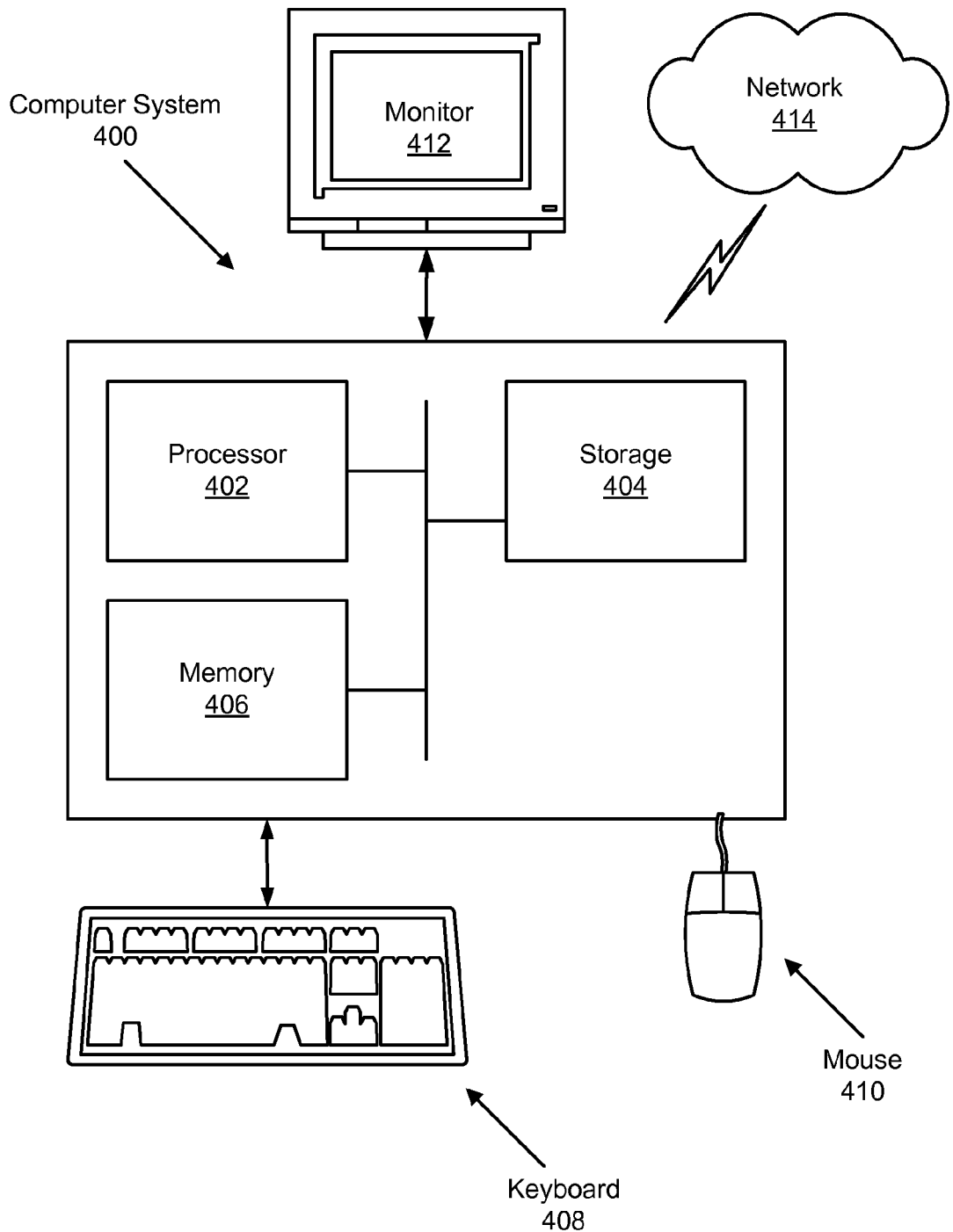
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processors (402), associated memory (406) (e.g., random access memory (RAM), cache memory, flash memory, etc.), a storage device (404) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a number of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for self-tuning of hardware resources, comprising:
   a processor;
   a hardware layer comprising a hardware resource;
   an operating system executing on the processor, wherein the operating system is configured to:
      determine the hardware resource;
      obtain a profile for the hardware resource from a persistent storage device,
         wherein the profile for the hardware resource specifies a hardware architecture;
         wherein the profile comprises a metric with which to monitor utilization of the hardware resource, and
         wherein the metric is a performance indicator of the hardware resource with the hardware architecture;
      determine, from the profile, the metric;
      determine a first hardware resource management policy for governing utilization of the hardware resource;
      determine a first primary sub-range and a first secondary sub-range of the metric based on the first hardware resource management policy, wherein the first secondary sub-range includes the first primary sub-range; and
      send a first hardware resource management policy directive to a configuration engine, wherein the first hardware resource management policy directive comprises the metric, the first primary sub-range and the first secondary sub-range;
   a metric monitoring unit, wherein the metric monitoring unit is configured to:
      monitor the hardware resource to obtain a first hardware resource data value for the metric;
   the configuration engine, wherein the configuration engine is configured to:

receive the first hardware resource management policy directive from the operating system;

determine the first primary sub-range and the first secondary sub-range for the metric from the first hardware resource management policy directive;

obtain the first hardware resource data value for the metric from the metric monitoring unit;

when the first hardware resource data value for the metric is outside the first primary sub-range and inside the first secondary sub-range:

determine, by the hardware layer in the system and without the operating system, a first hardware resource optimization routine to bring utilization of the hardware resource into compliance with the first primary sub-range; and execute, in the hardware layer, the first hardware resource optimization routine;

when the first hardware resource data value for the metric is outside both the first primary sub-range and the first secondary sub-range:

determine, by the operating system, a second hardware resource management policy directive for the hardware resource; and send the second hardware resource management policy directive to the configuration engine.

2. The system of claim 1, wherein
the configuration engine is further configured to:

when the first hardware resource data value for the metric is outside both the first primary sub-range and outside the first secondary sub-range after the execution of the second hardware resource optimization routine:

send a first interrupt message to the operating system to initiate the determination of a second hardware resource management policy.

3. The system of claim 1, wherein executing the first hardware resource optimization routine reconfigures an operating parameter for the hardware resource.

4. The system of claim 1, wherein obtaining the first hardware resource data value for the metric from the metric monitoring unit by the configuration engine comprises:

polling the metric monitoring unit.

5. The system of claim 1, wherein obtaining the first hardware resource data value for the metric from the metric monitoring unit by the configuration engine comprises:

receiving a first interrupt message when the first hardware resource data value is outside the first primary sub-range; and receiving a second interrupt message when the first hardware resource data value is outside the second primary sub-range.

6. The system of claim 1, wherein determining the first hardware resource management policy used to govern utilization of the hardware resource comprises:

obtaining the hardware resource management policy from the persistent storage device, wherein the hardware resource management policy specifies the first primary sub-range and the first secondary sub-range for the metric used for monitoring the hardware resource.

* * * * *